RECOVERY OF HYDROCARBONS FROM SUBTERRANEAN RESERVOIRS

Original Filed July 19, 1957

*INVENTOR.*
ROBERT L. LINDAUER, JR.,
*BY*
Thomas B. McMullen
ATTORNEY.

United States Patent Office

Re. 24,873
Reissued Sept. 27, 1960

24,873

RECOVERY OF HYDROCARBONS FROM SUBTERRANEAN RESERVOIRS

Robert L. Lindauer, Jr., Smith County, Tex., assignor, by mesne assignments, to Jersey Production Research Company, Tulsa, Okla., a corporation of Delaware Original No. 2,885,003, dated May 5, 1959, Ser. No. 673,036, July 19, 1957. Application for reissue Sept. 8, 1959, Ser. No. 838,812

19 Claims. (Cl. 166—9)

Matter enclosed in heavy brackets [ ] appears in the original patent but forms no part of this reissue specification; matter printed in italics indicates the additions made by reissue.

The present invention is directed to a method for recovering hydrocarbons from subterranean reservoirs. More particularly, the invention is directed to a method of increasing ultimate recovery of oil from subterranean reservoirs by improving the natural drive mechanism of the reservoirs. In its more specific aspects the invention is concerned with recovering increased amounts of liquid hydrocarbons from subterranean reservoirs under substantially natural reservoir conditions.

The present invention may be briefly described as a method for recovering hydrocarbons from a subterranean reservoir containing liquid hydrocarbons. The reservoir contains a fluid other than the liquid hydrocarbons in contact with the liquid hydrocarbons. The feature of the invention resides in injecting into the reservoir a sufficient amount of a fluid in contact with the liquid hydrocarbons at a point adjacent the contact such that a layer is formed which is at least partially miscible with the liquid hydrocarbons or at least partially miscible with both the liquid hydrocarbons and fluid originally in contact with the liquid hydrocarbons, the layer being between the liquid hydrocarbons and the fluid in contact with the liquid hydrocarbons. Thereafter, the liquid hydrocarbons are produced in increased amounts under substantially natural reservoir conditions. Stating this otherwise, once the layer or layers are formed, depletion of the liquid hydrocarbons under the influence of the natural gas cap drive or the natural water drive will recover more hydrocarbon liquids than would have been recovered if these layers had not been formed.

In the practice of the present invention the fluid in contact with the liquid hydrocarbons is either an overlying gas cap or an underlying water body, which assists in driving the liquid hydrocarbon to the points of production, or both an overlying gas cap and an underlying water body. The reservoirs are known to those skilled in the art as gas cap drive, water drive, or combination gas cap and water drive reservoirs.

In accordance with the practice of the present invention, the injected fluid is injected adjacent one or both of the contacts. The injection may be either into the gas cap adjacent the contact, or into the liquid hydrocarbons adjacent the contact with the gas, or into the liquid hydrocarbons adjacent the water contact or into the water adjacent to the contact. The injection may be either in the liquid hydrocarbons or in the gas adjacent the contact between the gas and the liquid hydrocarbons and into the liquid hydrocarbons or water adjacent the water contact. Stating this otherwise, injections of fluids may be made adjacent both contacts.

Whether the fluids are injected into the hydrocarbon liquid or into the fluid originally in contact with the hydrocarbon liquid depends upon the nature of the injection fluid, its interaction with the reservoir fluids, the relative densities of all fluids, as well as other factors. Under normal field conditions, few wells will be available that are completed exactly on the contact of the hydrocarbon liquid and other fluid in the underground reservoir. However, some wells are usually near the contact. Injection will ordinarily be made in existing wells near the contact, and the injection fluid will be selected to take advantage of the relative densities of all fluids so that the injection fluid will migrate to form the desired layer.

When the fluids are injected, forces of gravity, due to the difference in density of the injection fluid and the fluid being injected into, will cause the injection fluid to migrate in the reservoir. The direction of migration will be up if the injection fluid has less density than the fluid being injected into and down if it is more dense. Depending upon the nature of the injection fluid and the fluid receiving the injection, there may be an interaction between the two fluids. If a gas is injected into a hydrocarbon liquid, there will be sorption of components, one from the other, and gas going into solution with the changed hydrocarbon liquids, beginning on contact of the fluids; and the character of both fluids will change. By the selection of the proper gas, this change will cause the injection fluid and the hydrocarbon liquid to become miscible or more nearly miscible. If the injected gas has a lower density than the hydrocarbon liquid, the injected gas will flow up through the hydrocarbon liquid while the interaction is occurring, and the hydrocarbon liquid will tend to flow down because of its greater density and to replace downdip hydrocarbon liquid production. By this action, a form of counter-current flow will be set up. The exchange of components between the hydrocarbon liquid and the injected gas will continue as uncontacted liquid is encountered by the migrating injection gas; however, the quantity of hydrocarbon liquid between the injection well and the contact with the original gas cap gas will ordinarily be small, and there will be more injected gas than can interact with the oil. The upward migration of the injected gas will continue until it contacts a fluid of lesser density, and there it will spread out along this contact forming a layer.

From this description, it should be apparent to those skilled in the art of underground reservoir behavior that layers may be formed by injection in either the original reservoir liquid hydrocarbons or the fluid originally in contact with the reservoir liquids, and the injection fluid can be either liquid or gas in the reservoir.

An important consideration in determining the most desirable point of injection is the difference in density between the injected fluid and the hydrocarbon liquids as compared to the difference between the injected fluids and the reservoir fluid contacting the hydrocarbon liquids. In general, the layer will form more quickly by injection into the reservoir fluid which has the greatest density difference to the injected fluid.

The injected fluid may be selected from a large number of fluids which are satisfactory in the present invention. The injected fluid may be heavier than the original reservoir fluid in contact with the liquid hydrocarbons or lighter than the original reservoir fluid in contact with the hydrocarbons. The injected fluid may also be lighter than the liquid hydrocarbons but heavier than the gas cap gas, or the injected fluid may be heavier than the liquid hydrocarbons but lighter than the underlying water. The injected fluid may be lighter than the liquid hydrocarbons but richer in ethane and heavier hydrocarbons than the gas cap gas when the fluid in contact with the liquid hydrocarbons is gas. The injection fluids may be hydrocarbons or other substances such as $CO_2$ or certain alcohols.

The amount of the injected fluid may range from about 1 to 50 percent of the pore volume of the reservoir occupied by the hydrocarbon liquid. Ordinarily, an amount of about 30 percent of the pore volume of the reservoir may be sufficient to take full benefit of the process, although less injection may still improve recovery. Experiments using a sand-packed tube saturated with the hydrocarbon liquid and the contact fluid to simulate reservoir behavior are helpful in determining the optimum injection volume for the layer. Experimental recoveries by injecting different amounts of layer substance permit construction of a curve such as Figure 1. Other factors must be considered when applying these experiments to the field because the reservoir cannot be duplicated by the sand-packed tube, but such experiments form an excellent basis for departure. Ordinarily, heavy viscous oils will require more injection, and usually a greater volume of fluid will be needed if the injection fluid is gas than if it is liquid at reservoir conditions.

The injected fluid may be injected into the reservoir over a period of time from about 1 month or less to several years, depending upon the amount of injection fluid required. For best results the period should be as short as practical while preventing a temporary build-up in reservoir pressure causing reservoir oil migration into the space occupied by a fluid originally in contact with the oil. Ordinarily early completion of injection takes maximum advantage of gravity to place the layer. A time from about 2 weeks to about 2 years may be required.

The injected fluid may suitably be injected in increments to achieve miscibility or partial miscibility, and the increments of the injected fluid may be different one from the other, such as, for example, one increment may be gas and another increment may be a light oil, or one increment may be liquefied petroleum gases and another increment may be a heavier oil or a lighter gas.

The injected fluid, as stated before, may be selected from a large number of suitable fluids for injection. As examples given by way of illustration and not by way of limitation, one type of injected fluid, which forms a layer miscible or partially miscible at least with the liquid hydrocarbons, is a hydrocarbon gas which is richer or has a greater proportion of ethane and heavier intermediate hydrocarbons than the gas in equilibrium with the oil. In general, the greater the proportion of ethane and heavier intermediate hydrocarbons, the greater will be the solubility of the injected fluid in the oil and the greater will be the chances for complete miscible displacement.

Another type of fluid suitable for injection to form a layer at least miscible or partially miscible with liquid hydrocarbons may be the so-called liquefied petroleum gas containing propane, butane, pentane, and higher members of the same homologous series up to decane and higher. Ethane may also form a constituent of the injected fluid, and moderate quantities of methane can be present. The injected fluid may suitably be mixtures of hydrocarbons, such as petroleum fractions, as exemplified by gasoline, kerosene, gas oils, diesel oils, and the like. Suitably such liquid petroleum fractions may contain dissolved gases. Other compounds may be used such as carbon dioxide, and the like.

Other types of injection fluids for injecting adjacent the water-oil contact may be oxygenated compounds, such as the aliphatic alcohols, as exemplified by propyl, butyl, pentyl, hexyl, and the like, alcohols. Other oxygenated compounds, such as acetone and the ketones, may suitably be used. In a general sense, the compounds suitable for use in the practice of the present invention may have both oil and water solubility or preferential solubility for the oil. However, it is preferred to use hydrocarbon components as the injected fluid since they are more readily available from an economical standpoint and do not act as contaminants for the hydrocarbons produced during the final stages.

The present invention will be further illustrated by reference to the drawing in which.

Figure 2:
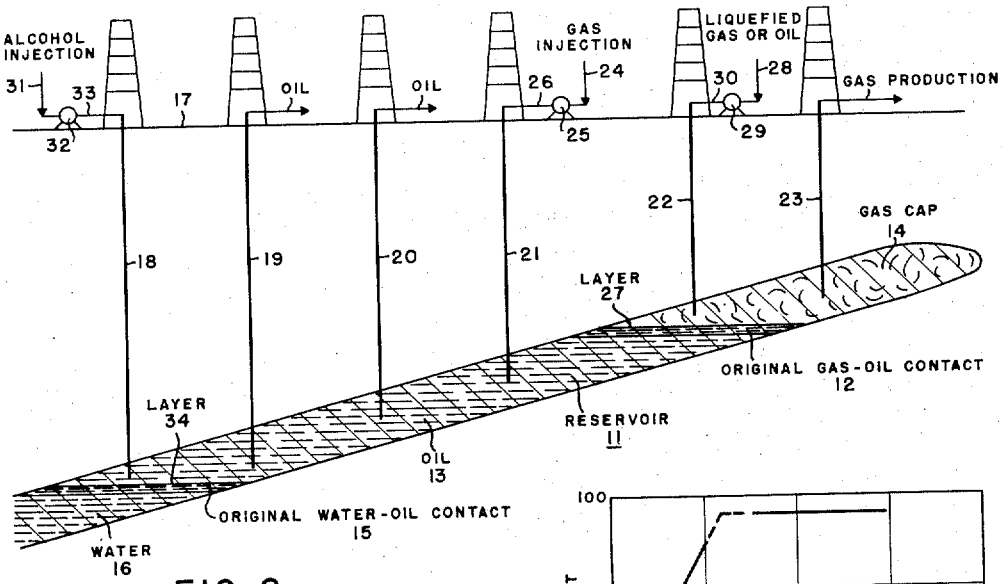
Fig. 2 is a view in cross section of a subterranean earth formation penetrated by a plurality of wells for treatment in accordance with the invention.
Figure 1:
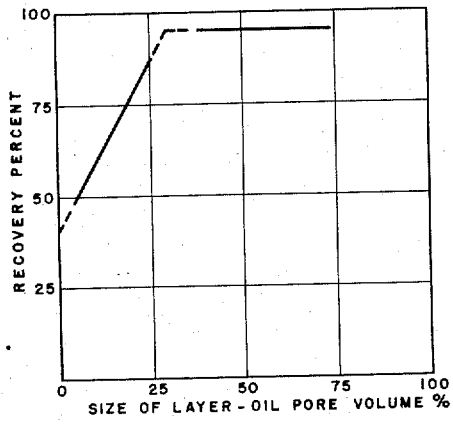
Fig. 1 is a graph illustrating recoveries possible in the practice of the present invention.

Referring now to the drawing, numeral 11 designates a subterranean reservoir which has an original gas and oil contact 12 between the liquid hydrocarbons or oil 13 and the gas cap 14. The reservoir 11 also has an original water-oil contact 15 between the oil 13 and the water 16. Drilled from the earth's surface 17 and penetrating the reservoir 11 is a plurality of wells 18, 19, 20, 21, 22, and 23. Referring to the wells 18 to 23, inclusive, well 18 is at least a temporary injection well, while wells 19 and 20 are oil-productive wells, and wells 21 and 22 are at least temporary injection wells, while well 23 may be a gas-productive well.

In accordance with the present invention, the fluid forming a layer at least partially miscible with the liquid hydrocarbons may be injected adjacent the original gas-oil contact 12. This may be done by injecting a suitable gas through the injection well 21 by introducing a gas having the desirable composition and density through line 24 connecting to compressor 25 and thence by line 26 into well 21. The injected gas is of sufficient characteristics that it will migrate through the reservoir 11 to form a layer 27 between the liquid hydrocarbons 13 and the gas hydrocarbons 14 in the reservoir. Another way is to inject a light oil with low viscosity such as gasoline, kerosene, gas oil or diesel oil range into well 21 in a similar manner. Likewise, if desirable, the injected fluid may be injected through well 22 by injecting a liquefied petroleum gas by way of line 28 connecting into pump 29 and to well 22 by line 30. By virtue of the characteristics of the liquefied petroleum gas into well 22, the injected fluid migrates through the reservoir 11 also to form a layer 27. When fluid is injected into well 22, it is desirable that it achieve miscibility with the gas cap gas 14 as well as the hydrocarbon liquids, otherwise part of the injected fluid will not migrate to the layer 27 but will remain in the gas cap region as residual unrecovered saturation. Extra injection to form the desired layer size will therefore be required. In some instances it may be desirable to inject light oil through well 21 and to inject liquefied petroleum gas through well 22. This may be done incrementally through both wells, may be injected incrementally through well 21 or incrementally through well 22.

When it is desired to inject a fluid adjacent the water-oil contact, a suitable alcohol, for example, may be injected by way of line 31 connecting to pump 32 and thence by line 33 into well 18 to form the layer 34 between the water 16 and the hydrocarbon or oil 13, as shown in the drawing. The characteristics of the injected fluid introduced through well 18 are such that the fluid migrates to form the layer 34. As stated before, under some conditions, it will be desirable to form both the layer 27 and the layer 34 to provide increased recovery of the liquid hydrocarbons in the reservoir 11.

It is to be emphasized that in the practice of the present invention the reservoir conditions are substantially unchanged. In other words, the invention here recovers oil through the natural mechanism of recovering oil from a subterranean reservoir wherein the natural gas cap drive and/or the natural water drive is supplemented and aided by providing a layer at the contacts, with the layer substantially or at least partially miscible with the oil in the case of the oil at the gas-oil contact or miscible with the oil where the layer is at the water-oil contact. In other words, in the practice of the present invention, it is unnecessary to increase or maintain the natural pressure of the reservoir. Furthermore, in the practice of the present invention it is unnecessary to inject continuously the injected fluid to produce hydrocarbons. The hydrocarbons may be produced simultaneously with the injection of fluid, but the injection of fluid may be terminated and hyrocarbon fluids produced continuously. In short, it is contemplated in the practice of the present invention that simultaneously with the injection of fluids, hydrocarbons may be produced from the reservoir with the natural drive being supplemented and/or augmented by the presence of the layer miscible at least with the liquid hydrocarbons. Also, it is contemplated in the practice of the present invention that after a sufficient amount of the injected fluid has been injected into the reservoir, the injection of fluid will be discontinued or terminated and production of hydrocarbons will proceed to allow the improved and increased recovery of hydrocarbons.

As a measure of the recovery possible in accordance with the present invention where the natural drive is improved, recoveries from about 80 to 100 percent of the communicable pore space in the reservoir may be possible in the practice of the present invention, whereas under the natural drive without a layer at least partially miscible with the liquid hydrocarbons, recoveries of approximately 45 percent by gas cap drive may be expected and about 70 percent by water drive may be possible.

To illustrate the improved recoveries that may be obtained by this invention, an example is submitted for an oil reservoir such as illustrated in Figure 2, where the gas cap was originally the same size at the oil zone and where there is a water-oil contact but no pressure support or drive from the water. Table I lists data on the reservoir and oil characteristics:

TABLE I

| | |
|---|---|
| Original reservoir pressure | 3,200 p.s.i. |
| Original reservoir temperature | 197 F. |
| Viscosity of oil in reservoir | .28 cp. |
| Gas originally dissolved in the oil | 700 cubic feet per barrel. |
| Stock-tank gravity of oil | 39° API. |
| Barrels of stock-tank oil per barrel of reservoir oil | .73. |

Natural recovery from this type of reservoir is somewhat dependent upon the particular relative permeability characteristics of the formation rock and rate of depletion. However, under normal circumstances, recovery by the natural forces seldom exceeds 45 percent of the original reservoir oil in place. By the injection of a layer substance such as listed in Table II, the oil recovery may be increased substantially.

TABLE II

| | Volume percent |
|---|---|
| Methane | 44.52 |
| Ethane | 2.30 |
| Propane | 52.75 |
| Iso butane | 0.14 |
| N butane | 0.15 |
| Iso pentane | 0.04 |
| N pentane | 0.02 |
| Heavier | 0.08 |
| | 100.00 |

Figure 3:
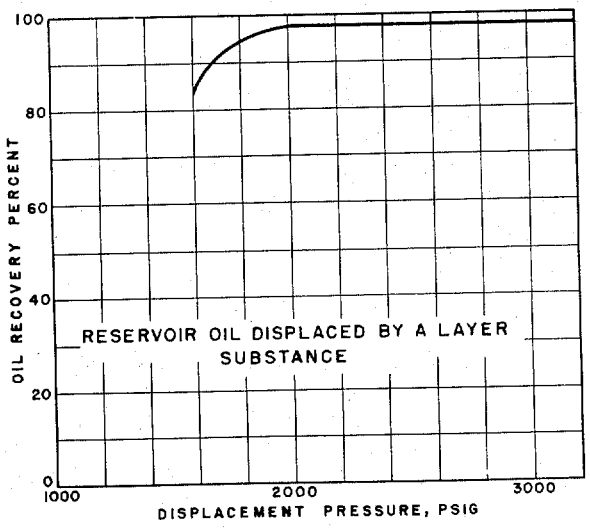
Fig. 3 is a plot of data illustrating oil recovery in accordance with the invention as a function of displacement pressure.

By displacing the reservoir oil from a sand-packed tube with the layer substance at different pressures, a graph such as Figure 3 may be constructed. With this graph and a prediction of reservoir pressure behavoir, recovery from the reservoir may be closely approximated. In the example, using a 90 percent effective sweep factor to conform to the inhomogeneity of the underground reservoir and a decline in pressure to about 1,560 at final depletion if 0.3 oil pore volume of layer substance is injected, the recovery may be 83 percent or on the order of a twofold increase over that expected if no layer substance is injected.

While the actual mechanism by way of the improved result obtainable herein is not completely understood, it is postulated by way of illustration and not by way of limitation that the injected fluid must have the property of forming a layer at least partially miscible with the oil. It may be desirable for the injected fluid to be miscible with both the oil and the gas cap gas or water. In this case a smaller volume of injection fluid is required to achieve high oil recovery and a high percentage of the injection fluid can be recovered at the end of oil production. When the oil is produced and the normal gas cap expansion or water drive takes place, the miscible layer may be pushed through the oil zone yielding the unexpected oil recovery. When the injected substance is a hydrocarbon gas to form a layer at the contact of the reservoir liquid and the gas cap which is richer or has a greater proportion of ethane and heavier intermediate hydrocarbons than the gas in equilibrium with the oil, it is postulated that this injected gas, when contacted with the reservoir components, may be dissolved in the oil causing a reduction in viscosity and surface tension and the volume of the liquid hydrocarbons. The mechanism may also involve sorption between the oil and injected gas and the gas cap gas and the richer injected gas, which further alters the layer between the gas and oil to make it miscible with the oil on the bottom side and with the gas cap gas on the top side. If the injected fluid is sufficiently rich in the ethane and heavier hydrocarbons, complete miscibility may be achieved and oil recovery may approach 100 percent of the communicable pore space. In a word, any injected gas may be employed which is richer than the equilibrium gas and which will achieve the postulated mechanism to at least an improved degree.

The nature and objects of the present invention having been completely described and illustrated, what I wish to claim as new and useful and secure by Letters Patent is:

1. A method for recovering hydrocarbons from a subterranean earth reservoir containing liquid hydrocarbons, said reservoir containing a fluid other than the liquid hydrocarbons in contact with the liquid hydrocarbons, which comprises injecting into said reservoir a sufficient amount of a fluid different from the liquid hydrocarbons and the fluid in contact therewith at a point adjacent said contact to form a layer at least partially miscible with the liquid hydrocarbons between the liquid hydrocarbons and the fluid in contact with the liquid hydrocarbons, said fluid different from the liquid hydrocarbons being injected into the gas cap when the fluid other than the liquid hydrocarbons is gas and into the liquid hydrocarbons when the fluid other than the liquid hydrocarbons is water, and producing said liquid hydrocarbons from said reservoir at a point removed from the point of contact under substantially reservoir conditions and under the natural drive of the reservoir whereby increased recovery of said liquid hydrocarbons is obtained.

2. A method in accordance with claim 1 in which the fluid in contact with the liquid hydrocarbons is gas and the injected fluid is lighter than the liquid hydrocarbons but heavier than the gas and is injected into the gas.

3. A method in accordance with claim 1 in which the fluid in contact with the liquid hydrocarbons is water and the injected fluid is heavier than the liquid hydrocarbons and is injected into the liquid hydrocarbons.

4. A method in accordance with claim 1 in which the fluid in contact with the liquid hydrocarbons is gas and the injected fluid is lighter than the liquid hydrocarbons but richer in ethane and heavier hydrocarbons than the gas.

5. A method for recovering hydrocarbons from a subterranean earth reservoir containing liquid hydrocarbons, said reservoir having an overlying gas cap in contact with the liquid hydrocarbons, which comprises injecting into the gas cap of said reservoir a sufficient amount of a fluid having a composition different from the liquid hydrocarbons and the gas in contact therewith at a point adjacent said contact to form a layer at least partially miscible with the liquid hydrocarbons between the liquid hydrocarbons and the gas in contact with the liquid hydrocarbons, and producing said liquid hydrocarbons from said reservoir at a point remote from the point of contact under substantially reservoir conditions and under the natural gas drive of the reservoir whereby increased recovery of said liquid hydrocarbons is obtained.

6. A method for recovering hydrocarbons from a subterranean earth reservoir containing liquid hydrocarbons, said reservoir having an underlying water body, which assists in driving the hydrocarbon liquids to the points of production, in contact with the liquid hydrocarbons, which comprises injecting into the liquid hydrocarbons in said reservoir a sufficient amount of a fluid different from the liquid hydrocarbons and the water in contact therewith at a point adjacent said contact to form a layer at least partially miscible with the liquid hydrocarbons between the liquid hydrocarbons and the water in contact with the liquid hydrocarbons, and producing said liquid hydrocarbons from said reservoir at a point remote from the point of contact under substantially reservoir conditions and under the natural water drive of the reservoir whereby increased recovery of said liquid hydrocarbons is obtained.

7. A method for recovering hydrocarbons from a subterranean earth reservoir containing liquid hydrocarbons, said reservoir having an overlying gas cap and underlying water body in contact with the liquid hydrocarbons, which comprises injecting into said reservoir a sufficient amount of a fluid different from the liquid hydrocarbons and the gas and water in contact therewith at a point adjacent at least one of said contacts to form a layer at least partially miscible with the liquid hydrocarbons between the liquid hydrocarbons and said one of the contacts with the liquid hydrocarbons, said different fluid being injected into the reservoir at a level other than in the water body, and producing said liquid hydrocarbons from said reservoir at a point remote from the points of contact under substantially reservoir conditions and under the natural drive of the reservoir whereby increased recovery of said liquid hydrocarbons is obtained.

8. A method for recovering hydrocarbons from a subterranean earth reservoir containing liquid hydrocarbons, said reservoir having an overlying gas cap and an underlying water body each in contact with the liquid hydrocarbons, which comprises injecting into said reservoir a sufficient amount of fluids having compositions different from each other and from the liquid hydrocarbons and the gas and water in contact therewith at a point adjacent each of said contacts to form a combined layer at least partially miscible with the liquid hydrocarbons between the liquid hydrocarbons and the gas and water in contact with the liquid hydrocarbons, said fluids having compositions different from each other and the liquid hydrocarbons being separately injected into the gas cap and into the liquid hydrocarbons, and producing said liquid hydrocarbons from said reservoir at a point remote from the points of contact under substantially reservoir conditions and under the natural drive of the reservoir whereby increased recovery of said liquid hydrocarbons is obtained.

9. A method for recovering hydrocarbons from a subterranean earth reservoir containing liquid hydrocarbons, said reservoir containing a fluid other than the liquid hydrocarbons in contact with the liquid hydrocarbons, which comprises injecting into said reservoir a sufficient amount in the range from about 1 to about 50 and ordinarily less than 30 percent of the hydrocarbon liquid pore volume of the reservoir of a fluid different from the liquid hydrocarbons and the fluid in contact therewith at a point adjacent said contact for a sufficient period of time to form a layer at least partially miscible with the liquid hydrocarbons between the liquid hydrocarbons and the fluid in contact with the liquid hydrocarbons, said different fluid being injected into the reservoir at a level other than in any water body in contact with the liquid hydrocarbons, and producing said liquid hydrocarbons from said reservoir at a point remote from the point of contact under substantially reservoir conditions and under the natural drive of the reservoir whereby increased recovery of said liquid hydrocarbons is obtained.

10. A method in accordance with claim 9 in which the amount is about 30 percent of the pore volume.

11. A method in accordance with claim 9 in which the time is about 1 year.

12. A method for recovering hydrocarbons from a subterranean earth reservoir containing liquid hydrocarbons, said reservoir containing a fluid other than the liquid hydrocarbons in contact with the liquid hydrocarbons, which comprises injecting into said reservoir a sufficient amount in the range from about 1 to about 50 percent of the oil pore volume of the reservoir of a fluid different from the liquid hydrocarbons and the fluid in contact therewith at a point adjacent said contact for a period of time from about 2 weeks to about 2 years to form a layer at least partially miscible with the liquid hydrocarbons between the liquid hydrocarbons and the fluid originally in contact with the liquid hydrocarbons, said different fluid being injected into the reservoir at a level other than in any water body in contact with the liquid hydrocarbons, discontinuing the injection of said fluid, and then producing said liquid hydrocarbons from said reservoir at a point remote from the point of contact under substantially reservoir conditions and under the natural drive of the reservoir whereby increased recovery of said liquid hydrocarbon is obtained.

13. A method for recovering hydrocarbons from a subterranean earth reservoir containing liquid hydrocarbons, said reservoir containing a fluid other than the liquid hydrocarbons in contact with the liquid hydrocarbons, which comprises injecting in increments into said reservoir a sufficient amount of a fluid different from the liquid hydrocarbons and the fluid in contact therewith at least at a point adjacent said contact to form a layer at least partially miscible with the liquid hydrocarbons between the liquid hydrocarbons and the fluid in contact with the liquid hydrocarbons, said different fluid being injected into the reservoir at a level other than in any water body in contact with the liquid hydrocarbons, and producing said liquid hydrocarbons from said reservoir at a point remote from the point of contact under substantially reservoir conditions and under the natural drive of the reservoir whereby increased recovery of said liquid hydrocarbons is obtained.

14. A method in accordance with claim 13 in which the increments of the injected fluid are different in composition from each other.

*15. A method for recovering hydrocarbons from a subterranean earth reservoir containing liquid hydrocarbons, said reservoir containing a fluid other than the liquid hydrocarbons in contact with the liquid hydrocarbons, which comprises injecting into said reservoir a sufficient amount of a fluid different from the liquid hydrocarbons and the fluid in contact therewith at a point adjacent said contact to form a layer at least partially miscible with the liquid hydrocarbons between the liquid hydrocarbons and the fluid in contact with the liquid hydrocarbons, said fluid being injected into the gas cap when the fluid other than the liquid hydrocarbons is gas and into one of the liquid phases when the fluid other than the liquid hydrocarbons is water, and producing said liquid hydrocarbons from said reservoir at a point removed*

*from the point of contact under substantially reservoir conditions and under the natural drive of the reservoir whereby increased recovery of said liquid hydrocarbons is obtained.*

*16. A method in accordance with claim 1 in which the fluid in contact with the liquid hydrocarbons is water and the injected fluid is injected into the liquid hydrocarbons.*

*17. A method in accordance with claim 15 in which the fluid in contact with the liquid hydrocarbons is water and the injected fluid is injected into the water.*

*18. A method in accordance with claim 1 in which the fluid in contact with the liquid hydrocarbons is gas and the injected fluid is injected into the gas.*

*19. A method for recovering hydrocarbons from a subterranean earth reservoir containing liquid hydrocarbons, said reservoir having an underlying water body, which assists in driving the hydrocarbon liquids to the points of production, in contact with the liquid hydrocarbons, which comprises injecting into the water in said reservoir*

*a sufficient amount of a fluid different from the liquid hydrocarbons and the water in contact therewith at a point adjacent said contact to form a layer at least partially miscible with the liquid hydrocarbons between the liquid hydrocarbons and the water in contact with the liquid hydrocarbons, and producing said liquid hydrocarbons from said reservoir at a point remote from the point of contact under substantially reservoir conditions and under the natural water drive of the reservoir whereby increased recovery of said liquid hydrocarbons is obtained.*

References Cited in the file of this patent or the original patent

UNITED STATES PATENTS

| | | |
|---|---|---|
| 2,043,731 | Doherty | July 28, 1936 |
| 2,742,089 | Morse et al. | Apr. 17 1956 |
| 2,842,204 | Horner | July 8, 1958 |
| 2,885,002 | Jenks | May 5, 1959 |